US009911397B2

(12) United States Patent
Glen

(10) Patent No.: US 9,911,397 B2
(45) Date of Patent: Mar. 6, 2018

(54) EXTENDING THE RANGE OF VARIABLE REFRESH RATE DISPLAYS

(71) Applicant: ATI Technologies ULC, Markham (CA)

(72) Inventor: David Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 32 days.

(21) Appl. No.: 14/589,560

(22) Filed: Jan. 5, 2015

(65) Prior Publication Data

US 2016/0196801 A1 Jul. 7, 2016

(51) Int. Cl.
*G09G 5/18* (2006.01)
*G06T 1/60* (2006.01)
*G09G 5/00* (2006.01)
*G09G 5/395* (2006.01)

(52) U.S. Cl.
CPC ............... *G09G 5/18* (2013.01); *G09G 5/003* (2013.01); *G09G 5/395* (2013.01); *G09G 2340/0435* (2013.01); *G09G 2360/18* (2013.01); *G09G 2370/04* (2013.01)

(58) Field of Classification Search
CPC ........... G09G 5/006; G09G 2340/0407; G09G 2360/02; G09G 2340/0435; G06F 3/1431; G06F 3/1475
See application file for complete search history.

(56) References Cited

U.S. PATENT DOCUMENTS 8,542,221 B1 * 9/2013 Wyatt ..................... G06F 15/00 345/204
2006/0077290 A1 * 4/2006 Chung .................. G09G 5/006 348/441
2008/0309652 A1 * 12/2008 Ostlund ................ G09G 5/363 345/211
2012/0242662 A1 * 9/2012 Ninan .................... G09G 3/003 345/419
2012/0300123 A1 * 11/2012 Lares .................... G06F 3/0488 348/441
2014/0184629 A1 * 7/2014 Wyatt .................... G09G 5/393 345/547
2015/0348509 A1 12/2015 Verbeure et al.
2015/0348511 A1 * 12/2015 Oriol ......................... G06F 3/01 345/212
2016/0275916 A1 9/2016 Glen

OTHER PUBLICATIONS

U.S. Patent and Trademark Office; U.S. Appl. No. 14/661,868; Final Rejection dated May 16, 2017.
U.S. Patent and Trademark Office; U.S. Appl. No. 14/661,868; Non-Final Rejection dated Sep. 28, 2016.

* cited by examiner

*Primary Examiner* — Md Saiful A Siddiqui
(74) *Attorney, Agent, or Firm* — Faegre Baker Daniels LLP

(57) ABSTRACT

Briefly, methods and apparatus to provide image content to, and display image content on, variable refresh rate displays with reduced input lag. The methods and apparatus allow for image tearing, or the displaying of image content from more than one video frame, when the render rate of a provided video frame falls outside the display refresh rate range of a variable refresh rate display when the display is refreshing with a previous frame (e.g. the display is in active refresh), thus reducing the input lag of the content of the provided video frame. The methods and apparatus may also prevent image tearing when the render rate of provided video frames is within the display refresh rate range of a display.

17 Claims, 5 Drawing Sheets

EXTENDING THE RANGE OF VARIABLE REFRESH RATE DISPLAYS

CROSS-REFERENCE TO RELATED APPLICATIONS

The present application is related to U.S. patent application Ser. No. 14/661,868, entitled "METHOD AND APPARATUS FOR COMPENSATING FOR VARIABLE REFRESH RATE DISPLAY RANGE LIMITATIONS," which was filed on Mar. 18, 2015 and the contents of which are incorporated by reference herein for all that it discloses.

BACKGROUND OF THE DISCLOSURE

The disclosure relates generally to providing image content to, and displaying image content on, displays, and more particularly to methods and apparatus for minimizing input lag and other problems associated with providing and displaying image content on variable refresh rate displays.

Variable refresh rate displays typically operate within a range of supported refresh rates in which the displayed image must be updated periodically. For example, a variable refresh rate display may have a minimum display refresh rate, and a maximum display refresh rate, whereby the minimum and maximum display refresh rates are not equal. Problems may occur if a display is not updated at a rate within its supported display refresh rate range. For example, if the image is updated at a slower rate than the minimum supported display refresh rate, the display may flicker, causing unwanted discrepancies in the viewed image. Thus, ideally images would be rendered and made available to a display at a rate within its supported display refresh rate range.

However, sometimes image rendering technologies may provide rendered images at render rates that fall outside a variable rate display's supported display refresh rate range, causing unwanted discrepancies in the viewed image such as those described above. In an attempt to solve these problems, some existing video display solutions may allow for refreshing a display with the same frame more than once, causing additional delays before content from a new frame is displayed. For example, a variable refresh rate display may have a display refresh range of 30 Hz to 120 Hz. If a frame is rendered and provided to the display, and no new frame is rendered at a rate faster than 30 Hz, but slower than 120 Hz, from the last provided frame, existing solutions may refresh the display with the same, already provided frame. If then a new frame is rendered at a rate faster than 120 Hz from the second time the display was refreshed with the previous frame, the new frame is not displayed until the next available refresh cycle. Thus, these solutions cause a new frame to wait until the next refresh cycle before being displayed. In the case when the render rate is much higher than the maximum supported display refresh rate, some solutions may provide for limiting the render rate of a new frame to the maximum supported display refresh rate, similarly causing a new frame to wait additional time before being displayed. These solutions, however, tend to increase input lag, e.g., the amount of time between when a change to a display image is provided and when the result appears on the display. For example, in video gaming, a key desire is to minimize input lag, so that when a user provides for an action (e.g. hits a key to move a character), the result of that action is seen as quickly as possible on the display.

In an attempt to reduce input lag, some prior art solutions allow for "image tearing" in fixed refresh rate displays, whereby anytime a new frame is made available while a display is being refreshed with display content from a previous frame, the display switches to provide content from the new frame, beginning with the scan line that is currently being refreshed (i.e. current scan line). The result is a tearing of the image, whereby part of the image is from the previous frame, and another part of the image is from the new frame. However, this may cause undesirable effects on the viewed image, for example, if the images of the previous and new frames are drastically different. In order to prevent image tearing, some systems allow for vertical synchronization whereby when enabled, the system will not allow for image tearing, although the problems associated with input lag, described above, still persist. Therefore there is a need to minimize input lag times and the effects of image tearing, along with other undesirable effects, in the displaying of images on variable refresh rate displays.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
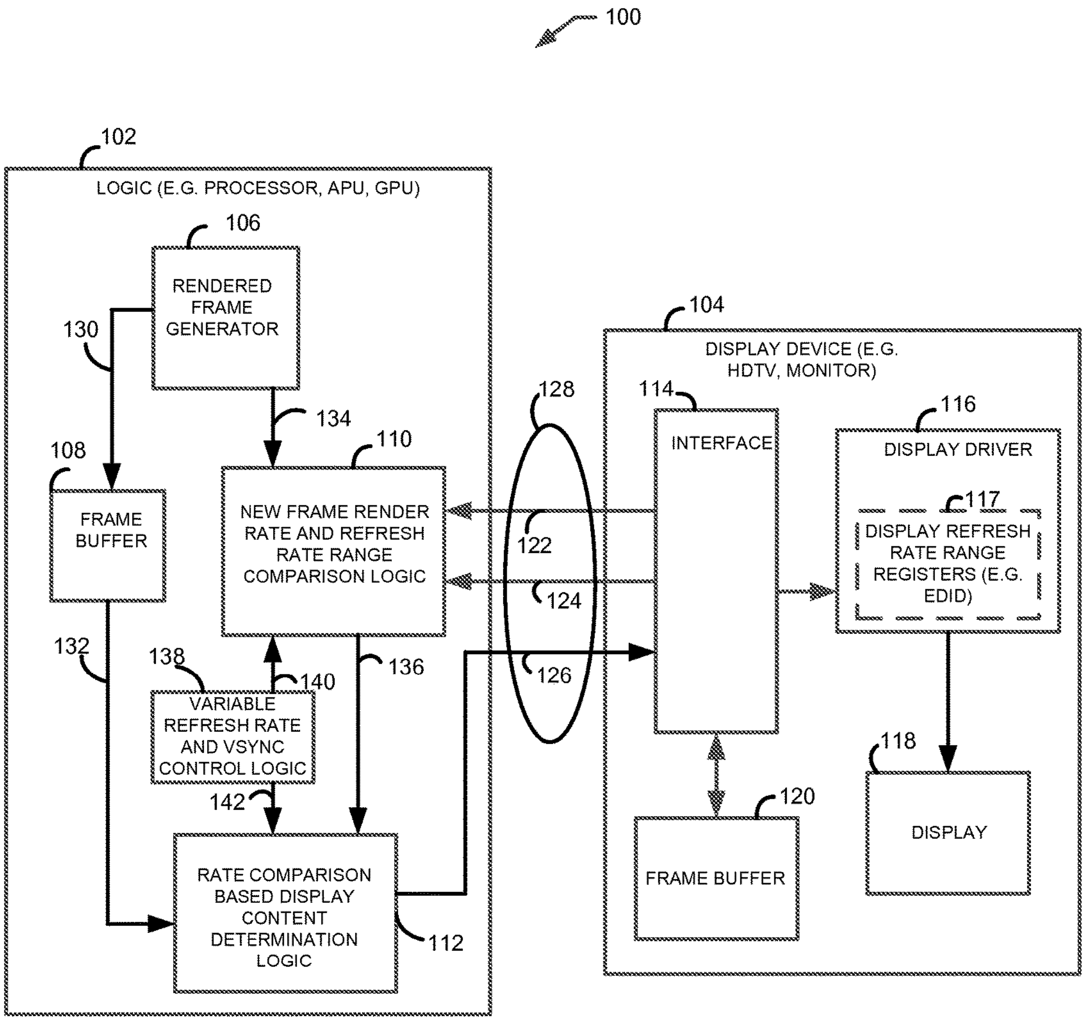
FIG. 1 is a functional block diagram illustrating an example device that includes new frame render rate and refresh rate range comparison logic and rate comparison based display content determination logic, which may be associated with a processor, such as, for example, a graphics processing unit (GPU), that provides display content to a display device.

Briefly, methods and apparatus to provide image content to, and display image content on, variable refresh rate displays with reduced input lag. The methods and apparatus allow for image tearing, or the displaying of image content from more than one video frame, when the render rate of a provided video frame falls outside the display refresh rate range of a variable refresh rate display while the display is refreshing with a previous frame (e.g. the display is in active refresh), thus reducing the input lag of the content of the provided video frame. The render rate of a provided video frame may be calculated, for example, with respect to the previously rendered frame. For example, if a first frame is rendered at time a, and the next frame is rendered at time b, the render rate of the next frame may be calculated by: (1/(time b−time a)) frames per second (FPS). Similarly, the render rate may be calculated with respect to the times when subsequent frames are provided to a display, or to when subsequent frames are actually displayed.

The methods and apparatus may also prevent image tearing when the render rate of provided video frames is within the display refresh rate range of a display. For example, in video gaming systems, a user may supply an input (e.g. keyboard key presses, joystick moves, etc.) to move a character in a game being displayed. If a rendered image is rendered at a render rate that is higher than the maximum refresh rate range of the display, by allowing image tearing the effect of the user moving the character (e.g. the character is now in a new position) is seen sooner, rather than having to wait until the next display refresh cycle. In one embodiment, logic, for example, a Graphics Processing Unit (GPU), determines whether a new frame has been rendered at a render rate outside of a refresh rate range of the display while the display is refreshing with a previous frame, and provides content from the new frame, including for a location on the display (e.g. corresponding to a location on the display) where the display is refreshing with the previous frame (e.g. current display scan location), when the logic determines that the new frame was rendered at a render rate outside of the display refresh rate range while the display was refreshing with a previous frame. For example, a display may have a display refresh rate range of 30 Hz to 120 Hz and a new frame may be rendered at 140 Hz. (This display refresh rate range is only exemplary and is not meant to be limiting. As is appreciated, a display refresh rate range may be a subset of continuous rates, any number of discrete rates, etc.) If, in this example, the display is currently refreshing with a previous frame when the new frame is rendered, then content from the new frame that corresponds to the display location that is about to be refreshed is provided to the display, such that image tearing may occur, whereby the displayed frame will contain content from both the previous frame and the new frame. For example, a display device may display content from a new frame at a location on the display where the display is refreshing with a previous frame when a new frame has been rendered at the render rate outside of a refresh rate range of a display while the display is refreshing with a previous frame.

Among other advantages, the amount of time it may take new content to be displayed is reduced. For example, rather than having to wait until the next display refresh cycle for new content to be displayed, new content is provided to the display while the display is refreshing with a previous frame. This may be advantageous, for example, in high-speed gaming applications, whereby user experience is enhanced by reducing the amount of time it takes new content to appear on a display. Other advantages will be recognized by those of ordinary skill in the art.

In one embodiment, logic provides content from a new frame for the location on the display corresponding to the first scan line of the display when the logic determines that a new frame has not been rendered at a render rate outside of the display refresh rate range of the display. In one example, if the logic determines that the new frame has been rendered at a render rate that is outside of the display while the display is not refreshing with a previous frame, the logic provides content from the new frame for the location on the display corresponding to the first scan line of the display. For example, a new frame may be rendered at a rate of 20 Hz for a display with a refresh rate range of 30 Hz to 120 Hz, where 20 Hz is determined to be outside the display's refresh rate range, while the display is not in an active refresh (e.g. the display is not refreshing with a previous frame). In this case, because the new frame was rendered at a rate outside the refresh rate range of the display, but the display was not refreshing with a previous frame, content from the new frame will begin to be provided to the display, beginning with new frame content corresponding to the first scan line of the display.

In one embodiment, logic determines that the new frame has been rendered at a render rate outside of a refresh rate range of a display while the display is refreshing with a previous frame when the render rate exceeds a maximum refresh rate of the display. For example, for a display with a display refresh rate range of 30 Hz to 120 Hz, content from a new frame is provided to the display when the display is refreshing with a previous frame and the new frame is rendered at a render rate above 120 Hz. In one embodiment, logic determines that a new frame has not been rendered outside the refresh rate range of a display while the display is refreshing with a previous frame when the render rate is less than or equal to the maximum refresh rate of the display. In one embodiment, logic may provide content from the previous frame for a location on a display where the display is refreshing with the previous frame when it is determined that the render rate is less than or equal to the maximum refresh rate of the display. For example, if a new frame is rendered at a rate of 20 Hz while the display, with a display refresh rate range of 30 Hz to 120 Hz, is refreshing with a previous frame, then content from the previous frame will continue to be provided, such that no image tearing will occur.

In one embodiment, logic determines that a new frame has been rendered at a render rate outside of the refresh rate range of a display while the display is refreshing with a previous frame when the render rate is less than a minimum refresh rate of the display. In one embodiment, logic determines that the new frame has not been rendered outside the refresh rate range of the display when the render rate exceeds or is equal to the minimum refresh rate of the display. In one embodiment, the logic may provide content from the previous frame for a location on the display where the display is refreshing with the previous frame when it is determined that the render rate exceeds or is equal to the minimum refresh rate of the display. For example, if a new frame is rendered at a rate of 140 Hz while a display has a display refresh rate range of 30 Hz to 120 Hz, then content from the previous frame will continue to be provided, such that no image tearing will occur.

In one embodiment, logic may determine whether a new frame has been rendered at a render rate outside of a refresh rate range of a display while the display is refreshing with a previous frame if the logic determines that vertical synchronization is disabled. (As known in the art, when vertical synchronization is enabled, image tearing is not allowed. For example, the display memory is prevented from changing until the display is done accessing content from the display memory for display during its current refresh cycle.) For example, if vertical synchronization is disabled, then the logic may allow image tearing by providing new frame content to a display while a display is refreshing with a previous frame (e.g. new frame content corresponding to a location on the display where the display is refreshing with a previous frame) when a new frame has been rendered at a render rate outside of a refresh rate range of the display. In one embodiment, if the logic determines that vertical synchronization is enabled, then the logic may not allow image tearing, for example, when a new frame has been rendered at a render rate outside of a refresh rate range of a display while the display is refreshing with a previous frame. Instead, the logic may provide new frame content for display after the display has refreshed with the previous frame. For example, for a 120 Hz display refresh rate, it takes approximately 8 milliseconds to refresh all scan lines of a frame, and approximately 0.3 milliseconds are spent during the minimum vertical blanking interval (e.g. the minimum time between the last scan line of a previous display refresh cycle, and the first scan line of a new display refresh cycle). When vertical synchronization is enabled, the logic may not provide new frame content during the refreshing of scan lines of a previous frame, but may start to provide such content when the minimum vertical blanking interval elapses, or thereafter, such as to prevent image tearing of the previous frame. Alternatively, in one embodiment, if vertical synchronization is enabled, the logic may nonetheless provide new frame content corresponding to a location on the display where the display is refreshing with a previous frame when a new frame has been rendered at a render rate outside of a refresh rate range of the display while the display is refreshing with a previous frame.

In one embodiment, logic may begin providing new frame content corresponding the first location on a display (e.g. scan line 1), after providing new frame content corresponding to a location on the display where the display is refreshing with a previous frame, for display during the display's next refresh cycle. For example, after determining that a new frame has been rendered at a render rate outside the display refresh rate range of a display while the display is refreshing with a previous frame and providing new frame content that creates an image tear, new frame content, beginning with content corresponding to the first scan line of the display, may be provided, so as to complete the new frame image and eliminate the image tear, for the display's next refresh cycle. In one embodiment, logic schedules a new display refresh at or near the maximum display refresh rate supported by the display after an image tear. For example, continuing the example from just above, the new frame content, beginning with content corresponding to the first scan line of the display and ending with content corresponding to the display's last scan line, is provided to the display at the maximum refresh rate supported by the display so as to complete the new frame image during the display's next refresh cycle as quickly as the display will allow. In one embodiment, the logic maintains the maximum display refresh rate supported by the display until the display has completely refreshed with the newest frame available (e.g. no image tear condition).

In one embodiment, the device includes one or more of an accelerated processing unit (APU), a central processing unit (CPU), a graphics processing unit (GPU), and a video decompressor, where alone or together they include one or more of the logic and the display device, and are operative to provide frame content for display on a display.

Turning now to the drawings, and as described in detail below, one example of the presently disclosed system is a device including logic that provides display content and a display device that supports a variable refresh rate. The logic may be operative to generate rendered frames at a render rate and to compare the render rate to the display's supported refresh rate range to determine whether a new frame has been rendered at a render rate outside of the display refresh rate range while the display is refreshing with a previous frame. If the display is refreshing with a previous frame, and the render rate is outside of the display refresh rate range, the logic is operative to provide content from the new frame corresponding to a location on the display where the display is refreshing with the previous frame (e.g. current scan location of the refreshing display). The display device supports a variable refresh rate and is operative to receive provided content that may be displayed, in part or in whole, on a display.

FIG. 1 is a functional block diagram illustrating an example device 100 that includes logic 102 and display device 104 as described above and in further detail below. The device 100 may be, for example, any suitable device that may provide or display images such as, but not limited to, a mobile or smart phone, a phablet, a tablet, a laptop computer, a desktop computer, a camera, a portable media player, a video gaming system, an internet based gaming system, or any other suitable device including any suitable battery-equipped device, for example. More specifically, as illustrated in FIG. 1, the device 100 includes logic 102 which includes a rendered frame generator 106, a frame buffer 108 which may be, for example, on-chip or off-chip memory, new frame render rate and refresh rate range comparison logic 110, rate comparison based display content determination logic 112, and variable refresh rate and vsync control logic 138. In some embodiments, logic 102 may include one or more accelerated processing units (APU), central Processing unit (CPU) cores, General Processing Unit (GPU) cores or video decompressors (e.g. H.264, H.265, MPEG video decompressors) on one or more dies. Additionally or alternatively, logic 102 may include one or more digital signal processors (DSPs), one or more Field Programmable Gate Arrays (FPGAs), or one or more application-specific integrated circuits (ASICs). In some embodiments, some or all of the functions of logic 102 and display device 104 may be performed by any suitable processors.

Rendered frame generator 106 may generate rendered frames at a render rate that may be configurable or variable. For example, rendered frame generator 106 may include an accessible register that configures the render rate, among other functions. Rendered frame generator 106 may provide rendered frames via communication link 130 to frame buffer 108, whereby frame buffer 108 may store rendered frame data in memory. Frame buffer 108 may be any suitable storage mechanism, including but not limited to memory, a hard drive, any non-transitory computer readable medium such as but not limited to RAM, a cloud storage mechanism, or any suitable storage mechanism accessible via the web. Rendered frame generator 106 may also provide a new frame rate signal 134 to new frame render rate and refresh rate range comparison logic 110 that allows the render rate of a new frame to be computed. For example, new frame rate signal 134 may be a signal indicating that a new frame has been rendered and is available for display, allowing new frame render rate and refresh rate range comparison logic 110 to calculate the new frame render rate. Alternatively, new frame rate signal 134 may provide the new frame render rate, relieving new frame render rate and refresh rate range comparison logic 110 from calculating the same. New frame render rate and refresh rate range comparison logic 110 may receive a display's refresh rate range over communication link 122. Communication link 122 may be any suitable communication link that allows for the communication of display refresh rate range data which may be part of a display's extended display identification data (EDID). The new frame render rate and refresh rate range comparison logic 110 may optionally receive, over communication link 124, display scan information such as whether the display is currently refreshing, and the current scan location that the display is refreshing at. Communication link 124 may each be any suitable communication link that allows for the communication of display scan information.

New frame render rate and refresh rate range comparison logic 110 determines whether a new frame has been rendered at a render rate outside of a refresh rate range of a display, by comparing the new frame render rate and the display's refresh rate range. For example, new frame render rate and refresh rate range comparison logic 110 may make this determination while the display is refreshing with a previous frame. Additionally, new frame render rate and refresh rate range comparison logic 110 provides information over communication link 136 to rate comparison based display content determination logic 112 that indicates a determination of whether a new frame has been rendered at a render rate outside of a refresh rate range of a display while the display is refreshing with a previous frame. For example, the information may include one or more of whether or not the display is currently refreshing, whether or not the new frame render rate falls outside of the display's refresh rate range, and the current scan location that the display is refreshing at.

Rate comparison based display content determination logic 112 may provide rendered frame content over communication link 126, including content from a new frame that may correspond to the location on the display where the display is refreshing with a previous frame. Rate comparison based display content determination logic 112 may provide new frame content that may be stored in frame buffer 108 and accessed over communication link 132. The rendered frame content may be provided, for example, when new frame render rate and refresh rate range comparison logic 110 determines that the new frame has been rendered at a render rate outside of the refresh rate range while the display is refreshing with a previous frame. Rate comparison based display content determination logic 112 may also provide new frame content that may be stored in frame buffer 108 when new frame render rate and refresh rate range comparison logic 110 determines that the new frame has been rendered at a render rate within the display refresh rate range of the display. Communication links 122, 124, and 126 may each be any suitable communication link, including but not limited to a Display Port link, an HDMI link, $I^2C$ link, or any other suitable link, or may each be part of communication link 128. Communication link 128 may include other data communication signals or links, and may also be any suitable communication link, including Display Port, HDMI, or $I^2C$.

Variable refresh rate and vsync control logic 138 may provide control signals 140 and 142 to new frame render rate and refresh rate range comparison logic 110 and rate comparison based display content determination logic 112, respectively. Control signals 140 and 142 may each indicate, for example, whether the display is operating with a variable refresh rate range, and whether vertical synchronization ("vsync") is enabled. Control signal 140 may control whether new frame render rate and refresh rate range comparison logic 110 is enabled to determine whether a new frame has been rendered at a render rate outside of a refresh rate range of a display. Control signal 142 may control whether rate comparison based display content determination logic 112 may provide new frame content when a new frame has been rendered at a render rate outside of the refresh rate range while the display is refreshing with a previous frame. For example, if control signal 142 indicates that vsync is disabled, then rate comparison based display content determination logic 112 may provide new frame content when a new frame has been rendered at a render rate outside of the refresh rate range of the display while the display is refreshing with a previous frame, thus allowing image tearing.

In one example, if control signal 142 indicates that vsync is enabled, then image tearing is never allowed, and thus rate comparison based display content determination logic 112 may not provide new frame content when a new frame has been rendered at a render rate outside of the refresh rate range of the display while the display is refreshing with a previous frame. In one example, if control signal 142 indicates that vsync is enabled, rate comparison based display content determination logic 112 may nonetheless provide new frame content corresponding to a location on the display where the display is refreshing with a previous frame when a new frame has been rendered at a render rate outside of a refresh rate range of the display, and may only acknowledge vertical synchronization (e.g. prevent image tearing) when a new frame has been rendered at a render rate within the refresh rate range of the display.

In one example, if control signal 142 indicates that vsync is disabled, then rate comparison based display content determination logic 112 may allow image tearing anytime a new frame has been rendered outside the refresh range of the display while the display is refreshing with a previous frame. As will be recognized by a person skilled in the art, similar results may be achieved by enabling control signals, such as control signals 140 and 142, to control features of new frame render rate and refresh rate range comparison logic 110, rate comparison based display content determination logic 112, or a combination of the two. Additionally, control signals 140 and 142 may be controlled via a graphical user interface (GUI) (not shown), for example, whereby one may enable or disable one or more of these features.

Display device 104 may be a variable refresh rate display and includes interface 114, display driver 116, display 118, and frame buffer 120. Interface 114 may provide information on communication links 122 and 124, and may receive frame content data on communication link 126, as described above. Interface 114 is operatively coupled to frame buffer 120, which may be any suitable memory such as on-chip or off-chip memory, to store frame content data received over communication link 126. Interface 114 also allow display driver 116 to access frame content data in frame buffer 120, and provide it for display to display 118. For example, the display driver 116 may, every display refresh cycle, obtain frame content data from frame buffer 120 and provide it to display 118. For example, if display device 104 supports a display refresh rate range of 30 Hz to 120 Hz, the display driver 116 may update the display 118 between approximately every 8.33 milliseconds to 33.3 milliseconds.

In one configuration, frame content data provided over communication link 126 is provided directly for display, without the need for a frame buffer 120, thus minimizing latency between the time a frame is rendered and the time the frame is shown by display device 104. In another configuration, frame content data provided over communication link 126 is provided to both display driver 116 to minimize latency and to frame buffer 120. In this fashion, display driver 116 has access to both a new frame provided over communication link 126, and to a previous frame in frame buffer 120, and thus is able to perform image processing involving at least two frames to drive an image on to display 118.

The display driver 116 may also contain display refresh rate range registers 117, which may be EDID registers, indicating the supported display refresh rate range of the display. For example, the display refresh rate range registers

117 may allow logic 102 to determine the maximum supported refresh rate of display device 104, which would allow logic 102 to provide frame content for display at that rate. The display refresh rate range registers 117 may also allow logic 102 to configure display driver 116 to refresh display 118 at the maximum supported refresh rate.

Figure 2:
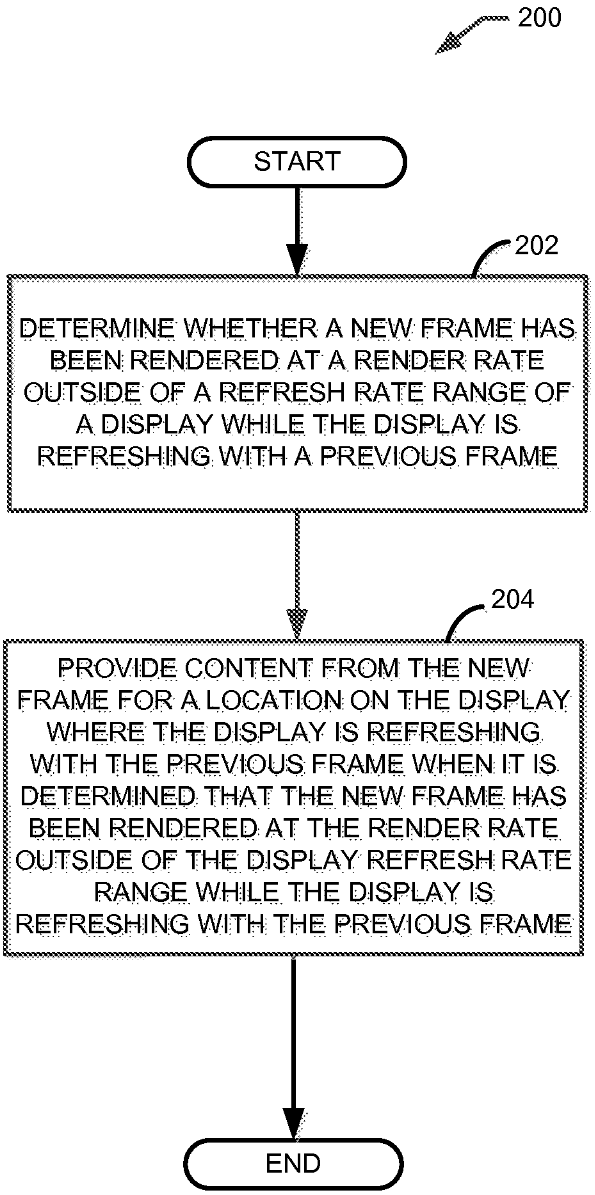
FIG. 2 is a flowchart of an example method for providing display content based on a comparison of a new frame render rate and a display refresh rate range.

FIG. 2 is a flowchart of an example method for providing frame content to a display. The method illustrated in FIG. 2, and each of the example methods described herein, may be carried out by one or more suitably programmed controllers or processors executing software (e.g., by logic 102 executing suitable instructions). The method may also be embodied in hardware or a combination of hardware and hardware executing software. Suitable hardware may include one or more GPUs, CPUs, APUs, application specific integrated circuits (ASICs), state machines, field programmable gate arrays (FPGAs), digital signal processors (DSPs), and/or other suitable hardware. Although the method(s) is/are described with reference to the illustrated flowcharts (e.g., in FIG. 2), it will be appreciated that many other ways of performing the acts associated with the method(s) may be used. For example, the order of some operations may be changed, and some of the operations described may be optional. Additionally, while the method(s) may be described with reference to the example apparatus 100, it will be appreciated that the method(s) may be implemented by other apparatus as well, and that the apparatus 100 may implement other methods.

The example method begins at block 202 where a determination is made as to whether a new frame has been rendered at a render rate outside of a refresh rate range of a display while the display is refreshing with a previous frame, such as may be performed by new frame render rate and refresh rate range comparison logic 110 of FIG. 1. For example, if a new data frame is rendered at 25 Hz while a display is in the process of refreshing with a previous frame, and the display has a refresh rate range of 30 Hz to 120 Hz, a determination may be made that the render rate for the new frame is outside the refresh rate range of the display. The method continues to block 204, where new frame content is provided corresponding to a location on the display where the display is refreshing with the previous frame when it is determined that the new frame has been rendered at a render rate outside of the refresh rate range while the display is refreshing with the previous frame. For example, rate comparison based display content determination logic 112, as described above, may provide such new frame content.

Figure 3:
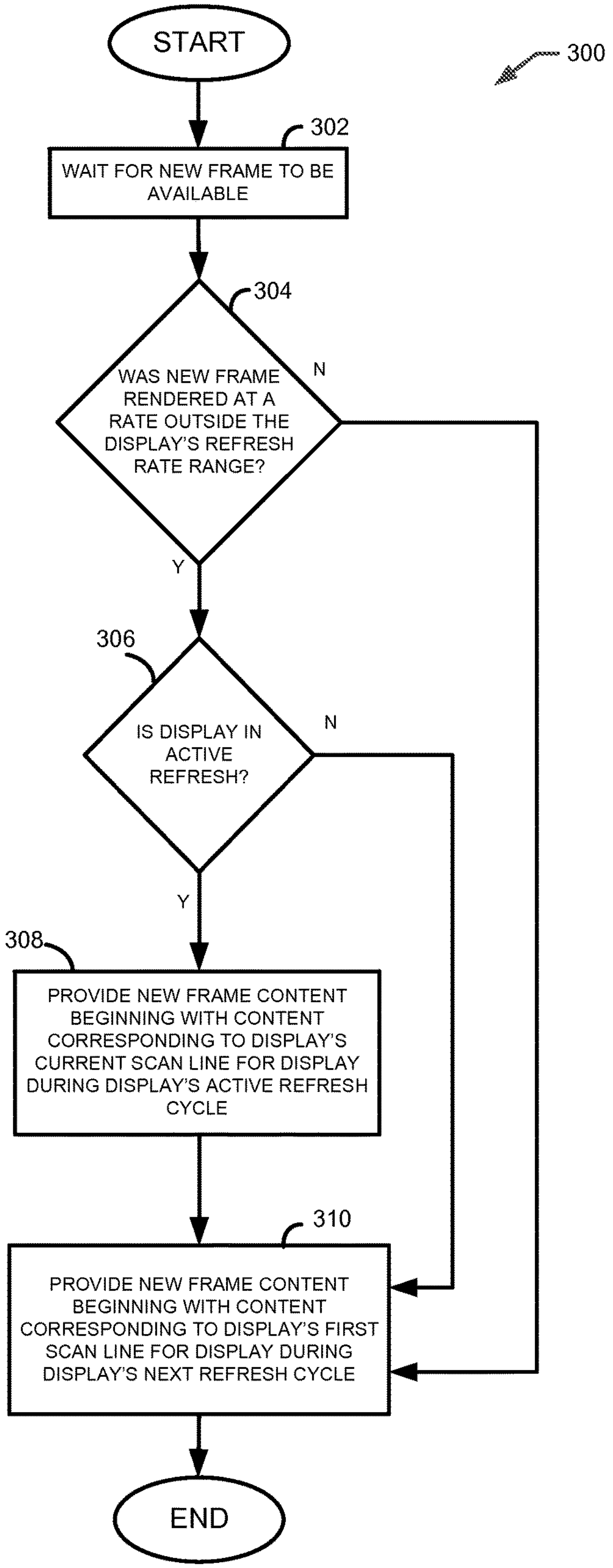
FIG. 3 is a flowchart of an example method for providing display content based on a comparison of a new frame render rate and a display refresh rate range and includes aspects of the method illustrated in FIG. 2.

FIG. 3 is a flowchart of another example method for providing frame content to a display, as may be performed, for example, by logic 102. The method 300 begins at block 302, where the method waits for a new rendered frame to be available. When a newly rendered frame is made available, as for example by rendered frame generator 106, the method proceeds to decision block 304, where a determination is made of whether the new frame was rendered at a rate outside the display's refresh rate range, as may be performed, for example, by new frame render rate and refresh rate range comparison logic 110. If the newly rendered frame was rendered at a rate outside the display's refresh rate range, then the method proceeds to block 306; otherwise the method proceeds to block 310. At decision block 306, a determination is made of whether the display is in active refresh. If the display is in active refresh (e.g. the display is refreshing with a previous frame), then the method proceeds to block 308; otherwise the method proceeds to block 310. At block 308, new frame content, beginning with content corresponding to the display's current scan line, is provided to the display to be displayed during the active display refresh cycle. For example, an image tear may occur such that the displayed image contains content from a previous frame, and from the new frame. After block 308, the method proceeds to block 310. At block 310, the method provides new frame content, beginning with content corresponding to the display's first scan line, to the display to be displayed during the display's next refresh cycle. For example, at block 310, rather than providing content during an active refresh cycle such that an image tear may result, content is provided for display during the next cycle, such that an image tear is disallowed. Blocks 308 and 310 may be performed, for example, by rate comparison based display content determination logic 112.

Figure 4:
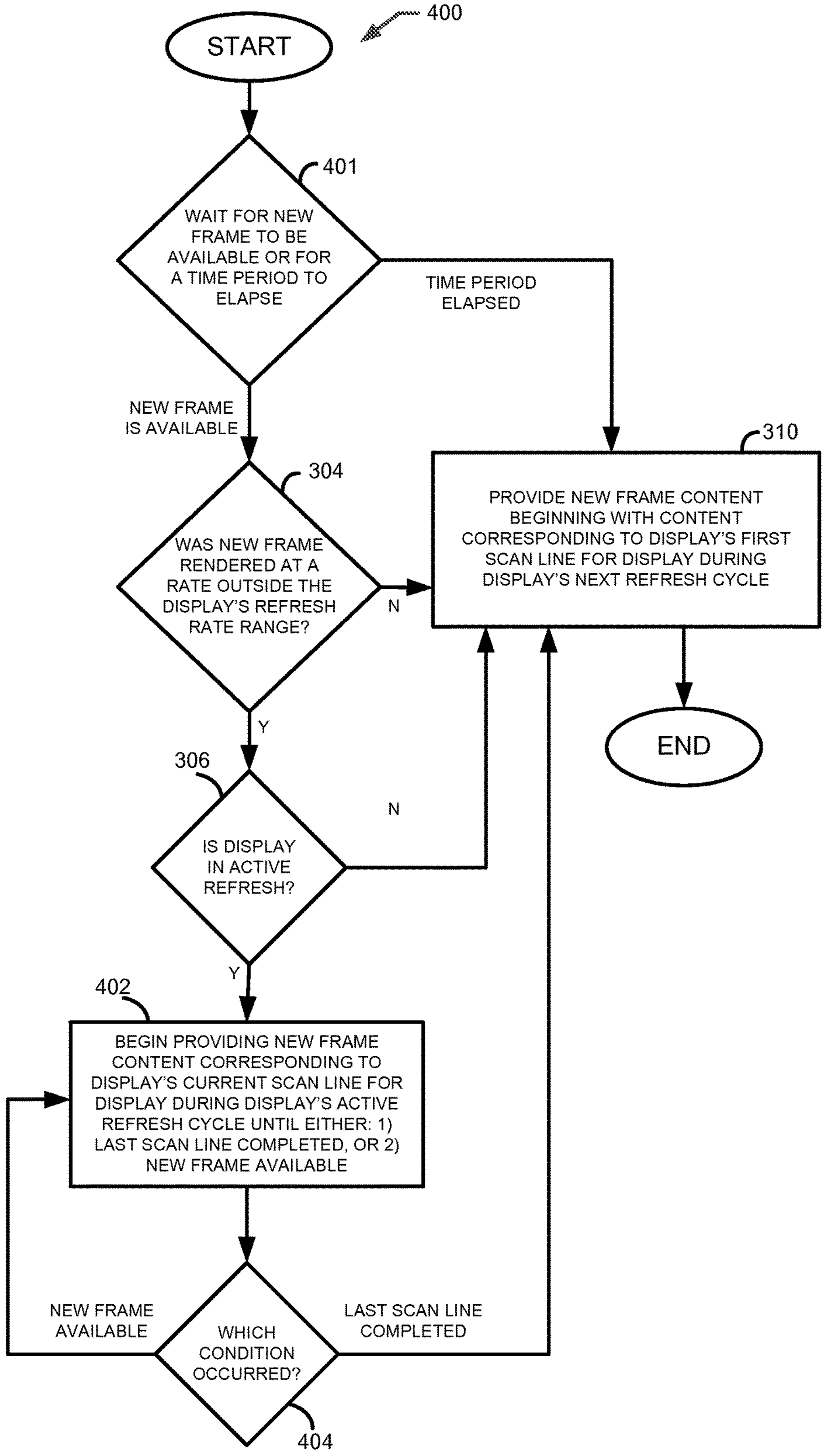
FIG. 4 is a flowchart of an example method for providing display content based on a comparison of a new frame render rate and a display refresh rate range and includes aspects of the methods illustrated in FIG. 2 and FIG. 3.

FIG. 4 is a flowchart of yet another example method for providing frame content to a display and includes aspects of the method illustrated in FIG. 3 and may be performed, for example, by logic 102. The method 400 begins at block 401, where the method waits for either a new rendered frame to be available, or for a time period to elapse. The time period, for example, may be related to the minimum refresh rate of the display. If the time period elapses, the method proceeds to block 310. Otherwise, when a newly rendered frame is made available, as for example by rendered frame generator 106, the method proceeds to decision block 304, where a determination is made of whether the new frame was rendered at a rate outside the display's refresh rate range. If the newly rendered frame was rendered at a rate outside the display's refresh rate range, then the method proceeds to block 306; otherwise the method proceeds to block 310 (e.g., frame was rendered within the display's refresh rate range). At block 306, a determination is made of whether the display is in active refresh. If the display is in active refresh (e.g. the display is refreshing with a previous frame), then the method proceeds to block 402; otherwise the method proceeds to block 310.

At block 402, new frame content beginning with content corresponding to the display's current scan line may be provided to the display to be displayed during the active display refresh cycle (e.g. allowing an image tear, such that the displayed image may contain content from a previous frame and the new frame) until one or more conditions occur. In one example, and as indicated in block 402, new frame content may be provided until either: the last scan line is completed, or until a newly rendered frame is available. When either of these conditions occurs, the method proceeds to decision block 404, where a determination is made as to which condition occurred. If a new frame became available, the method proceeds back to block 402, where new frame content, beginning with content corresponding to the display's current scan line, is provided to the display to be displayed during the active display refresh cycle. Thus, for example, an image tear may result, such that the display is displaying content from three frames including content from a previous frame, and content from the two newer frames.

Going back to block 404, if the condition occurring in block 402 was that the last scan line was completed, then the method proceeds to block 310, where new frame content, beginning with content corresponding to the display's first scan line, is provided to the display to be displayed during the display's next refresh cycle. For example, a new display refresh may be scheduled at the maximum display refresh rate supported by the display, and content from the new frame may be provided for display during that schedule refresh period. Blocks 402 and 404 may be performed, for example, by one or more of rendered frame generator 106, new frame render rate and refresh rate range comparison logic 110, and rate comparison based display content determination logic 112.

Figure 5:
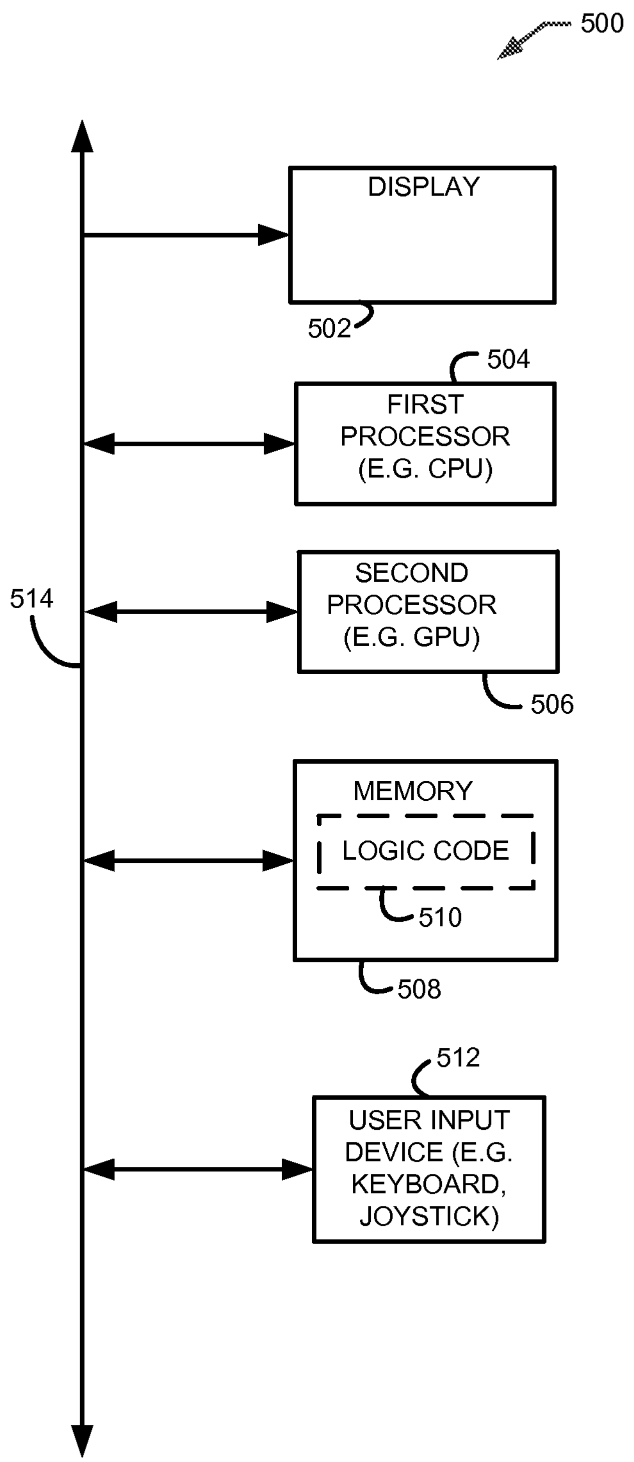
FIG. 5 is a functional block diagram illustrating an example apparatus including a central processing unit ("CPU"), a GPU, and logic code residing in memory.

In some examples, executable suitable instructions may be stored on a computer readable storage medium, where the executable instructions are executable by one or more processors to cause the one or more processors to perform the actions described herein. Turning to FIG. 5, a functional block diagram of another example embodiment 500 is shown that includes first processor 504 (e.g. CPU), second processor 506 (e.g. GPU), and memory 508. In some embodiments, memory 508 or any other suitable memory may store executable instructions including logic code 510 that when executed by first processor 504 performs some or all of the functions of logic 102 of FIG. 1. Similarly, memory 508 or any other suitable memory may store executable instructions that when executed by second processor 506 perform some or all of the functions of logic 102. For example, first processor 504 may execute instructions that perform the functions of new frame render rate and refresh rate range comparison logic 110 and rate comparison based display content determination logic 112, while second processor 506 may execute instructions that perform the functions of the rendered frame generator 106 of FIG. 1.

First processor 504 and second processor 506 may access memory 508 over expansion bus 514. Expansion bus 514 can be, for example, any number of interconnects allowing communication among the various devices. Display 502 may include some or all of the functionality of the display device 104 of FIG. 1, and may receive frame content over expansion bus 514 to be displayed. The received frame content may include, for example, content from a new frame for a location on the display where the display is refreshing with a previous frame when it is determined that the new frame was rendered at a render rate outside of the refresh rate range of display 502. The example embodiment 500 may also include one or more of input device 512, for example, to allow a user to provide input, such as in gaming systems. Some or all of this functionality may also be implemented in any other suitable manner such as but not limited to a software implementation, a firmware implementation, a hardware implementation, or any suitable combination of the example implementations described above.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method of providing display content for a variable refresh rate display, the method comprising:

responsive to a new frame being rendered at a render rate outside of a display refresh rate range of the display while the display is refreshing with a previous frame, providing content from the new frame corresponding to a location on the display where the display is refreshing with the previous frame, wherein the display continues refreshing with the provided content from the new frame from the location on the display where the display is refreshing with the previous frame;

determining that the new frame has been rendered at the render rate outside of the display refresh rate range of the display while the display is refreshing with the previous frame; and providing content from the new frame for the location on the display corresponding to the first scan line of the display when it is determined that the new frame has not been rendered at the render rate outside of the display refresh rate range of the display while the display is refreshing with the previous frame.

2. The method of claim 1, wherein a determination that the new frame has been rendered at the render rate outside of the display refresh rate range of the display while the display is refreshing with the previous frame comprises determining that the render rate exceeds a maximum display refresh rate of the display.

3. The method of claim 2, comprising:

wherein a determination that the new frame has not been rendered at the render rate outside of the display refresh rate range of the display while the display is refreshing with the previous frame comprises determining that the render rate is less than or equal to the maximum display refresh rate of the display, preventing an image tear by not providing content from the new frame while the display is refreshing with the previous frame when it is determined the new frame has not been rendered at the render rate outside of the display refresh rate range of the display while the display is refreshing with the previous frame.

4. The method of claim 1, wherein a determination that the new frame has been rendered at the render rate outside of the display refresh rate range of the display while the display is refreshing with the previous frame comprises determining that the render rate is less than a minimum display refresh rate of the display.

5. The method of claim 4, comprising:

wherein a determination that the new frame has not been rendered at the render rate outside of the display refresh rate range of the display while the display is refreshing with the previous frame comprises determining that the render rate exceeds or is equal to the minimum display refresh rate of the display, preventing an image tear by not providing content from the new frame while the display is refreshing with the previous frame when it is determined that the new frame has not been rendered at the render rate outside of the display refresh rate range of the display while the display is refreshing with the previous frame.

6. The method of claim 1, wherein determining whether the new frame has been rendered at the render rate outside of the display refresh rate range of the display while the display is refreshing with the previous frame comprises determining that vertical synchronization is disabled.

7. The method of claim 1, wherein providing content from the new frame corresponding to the location on the display where the display is refreshing with the previous frame further comprises:

scheduling a display refresh at or near the maximum display refresh rate supported by the display; and providing content from the new frame for the location on the display corresponding to the first scan line of the display for display during the scheduled display refresh.

8. A device capable of providing display content for a variable refresh rate display, the device comprising a processor operative to provide content from a new frame corresponding to a location on the display where the display is refreshing with a previous frame in response to the new frame being rendered at a render rate outside of a display refresh rate range of the display while the display is refreshing with the previous frame, wherein the display continues refreshing with the provided content from the new frame from the location on the display where the display is refreshing with the previous frame, wherein the processor is operative to determine that the new frame has been rendered at the render rate outside of the display refresh rate range of the display while the display is refreshing with the previous frame, and wherein the processor is operative to provide content from the new frame for the location on the display corresponding to the first scan line of the display when it is determined that the new frame has not been rendered at the render rate outside of the display refresh rate range of the display while the display is refreshing with the previous frame.

9. The device of claim 8, wherein the processor is operative to determine that the render rate exceeds a maximum display refresh rate of the display, wherein a determination that the new frame has been rendered at the render rate outside of the display refresh rate range of the display while the display is refreshing with the previous frame comprises determining that the render rate exceeds the maximum display refresh rate of the display.

10. The device of claim 9, wherein the processor is operative to:

determine that the render rate is less than or equal to the maximum display refresh rate of the display, wherein a determination that the new frame has not been rendered at the render rate outside of the display refresh rate range of the display while the display is refreshing with the previous frame comprises determining that the render rate is less than or equal to the maximum display refresh rate of the display; and prevent an image tear by not providing content from the new frame while the display is refreshing with the previous frame when it is determined the new frame has not been rendered at a render rate outside of the display refresh rate range of the display while the display is refreshing with the previous frame.

11. The device of claim 8, wherein the processor is operative to determine that the render rate is less than a minimum display refresh rate of the display, wherein a determination that the new frame has been rendered at the render rate outside of the display refresh rate range of the display while the display is refreshing with the previous frame comprises determining that the render rate is less than the minimum display refresh rate of the display.

12. The device of claim 11, wherein the processor is operative to:

determine that the render rate exceeds or is equal to the minimum display refresh rate of the display, wherein a determination that the new frame has not been rendered at the render rate outside of the display refresh rate range of the display while the display is refreshing with the previous frame comprises determining that the render rate exceeds or is equal to the minimum display refresh rate of the display; and prevent an image tear by not providing content from the new frame while the display is refreshing with the previous frame when it is determined the new frame has not been rendered at the render rate outside of the display refresh rate range of the display while the display is refreshing with the previous frame.

13. A non-transitory computer readable medium comprising executable instructions that when executed cause an integrated circuit (IC) fabrication system to fabricate one or more ICs that are operative to provide content from a new frame corresponding to a location on the display where the display is refreshing with a previous frame in response to the new frame being rendered at a render rate outside of a display refresh rate range of the display while the display is refreshing with the previous frame, wherein the display continues refreshing with the provided content from the new frame from the location on the display where the display is refreshing with the previous frame, the one or more ICs being further operative to determine that the new frame has been rendered at the render rate outside of the display refresh rate range of the display while the display is refreshing with the previous frame, and being further operative to provide content from the new frame for the location on the display corresponding to the first scan line of the display when it is determined that the new frame has not been rendered at the render rate outside of the display refresh rate range of the display while the display is refreshing with the previous frame.

14. The non-transitory computer readable medium of claim 13 comprising executable instructions that when executed cause the IC fabrication system to fabricate the one or more ICs to be operative to determine that the render rate exceeds a maximum display refresh rate of the display, wherein a determination that the new frame has been rendered at the render rate outside of the display refresh rate range of the display while the display is refreshing with the previous frame comprises determining that the render rate exceeds the maximum display refresh rate of the display.

15. The non-transitory computer readable medium of claim 14 comprising executable instructions that when executed cause the IC fabrication system to fabricate the one or more ICs to be operative to:

determine that the render rate is less than or equal to the maximum display refresh rate of the display, wherein a determination that the new frame has not been rendered at the render rate outside of the display refresh rate range of the display while the display is refreshing with the previous frame comprises determining that the render rate is less than or equal to the maximum display refresh rate of the display; and prevent an image tear by not providing content from the new frame while the display is refreshing with the previous frame when it is determined the new frame has not been rendered at the render rate outside of the display refresh rate range of the display while the display is refreshing with the previous frame.

16. The non-transitory computer readable medium of claim 13 comprising executable instructions that when executed cause the IC fabrication system to fabricate the one or more ICs to be operative to determine that the render rate is less than a minimum display refresh rate of the display, wherein a determination that the new frame has been rendered at the render rate outside of the display refresh rate range of the display while the display is refreshing with the previous frame comprises determining that the render rate is less than the minimum display refresh rate of the display.

17. The non-transitory computer readable medium of claim 16 comprising executable instructions that when executed cause the IC fabrication system to fabricate the one or more ICs to be operative to:

determine that the render rate exceeds or is equal to the minimum display refresh rate of the display, wherein a determination that the new frame has not been rendered at the render rate outside of the display refresh rate range of the display while the display is refreshing with the previous frame comprises determining that the render rate exceeds or is equal to the minimum display refresh rate of the display; and prevent an image tear by not providing content from the new frame while the display is refreshing with the previous frame when it is determined the new frame has not been rendered at the render rate outside of the display refresh rate range of the display while the display is refreshing with the previous frame.

* * * * *